UNITED STATES PATENT OFFICE.

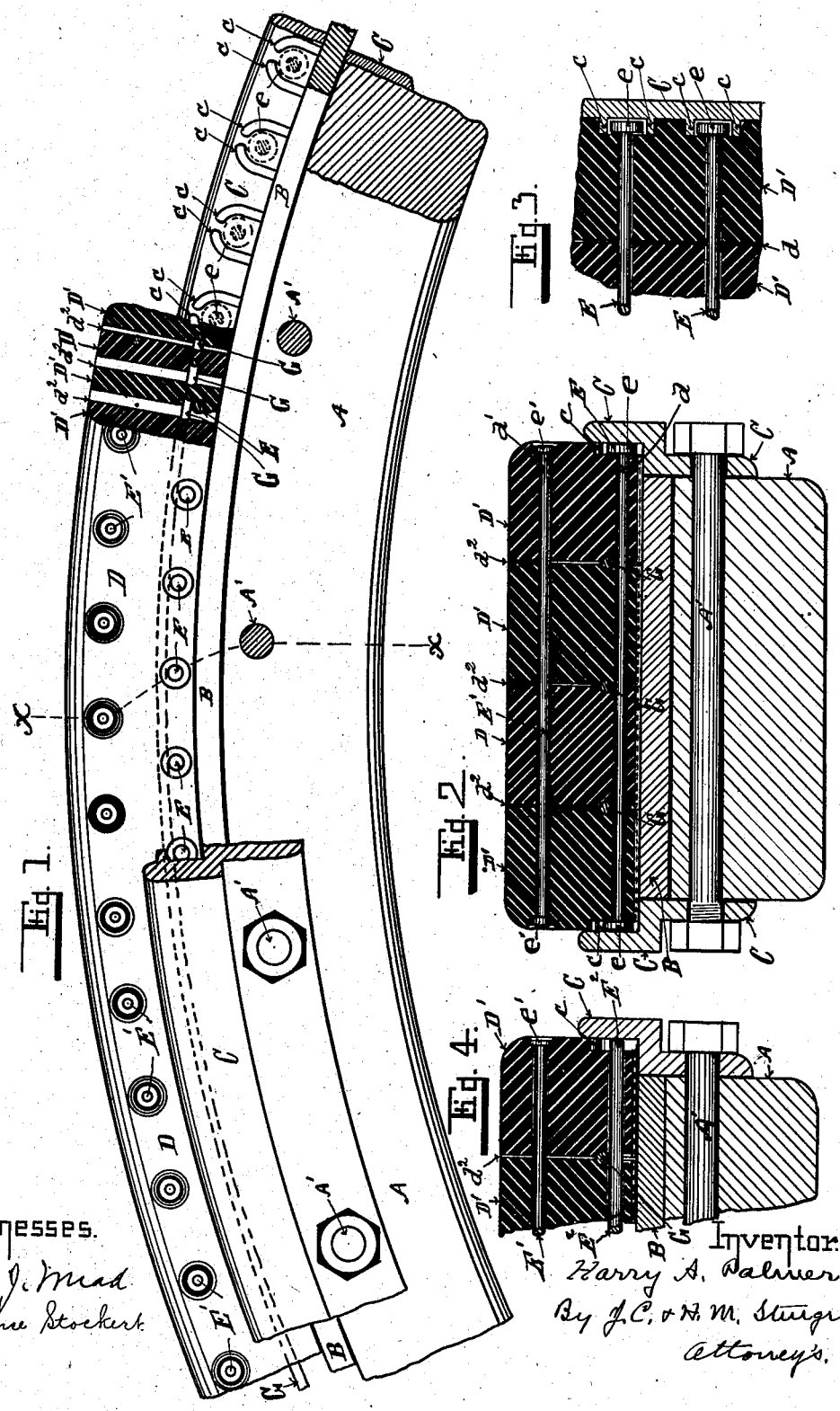

HARRY A. PALMER, OF AKRON, OHIO.

RESILIENT VEHICLE-TIRE.

No. 885,860.　　　　Specification of Letters Patent.　　　Patented April 28, 1908.

Application filed May 31, 1907. Serial No. 376,693.

*To all whom it may concern:*

Be it known that I, HARRY A. PALMER, a citizen of the United States, residing at Akron, in the county of Summit and State of Ohio, have invented certain new and useful Improvements in Resilient Vehicle-Tires; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention relates to resilient vehicle-tires, and particularly to that type of such tires designated as solid rubber tires.

Among the objects of my invention are the construction of a tire in comparatively small sections, whereby I can attain a more perfect vulcanization of the tire than is possible when the tire is made in an integral mass, and means whereby the sections of the tire can be laterally compressed and secured together upon a vehicle wheel rim, whereby an injured section may be removed therefrom and replaced by a new section thereby avoiding the replacing of an injured tire by an entire new one. These and other features of my invention are hereinafter fully set forth and explained and illustrated in the accompanying drawings, in which:

Figure 1 is a side view in elevation of sections of a wheel-rim, flanges, and rubber tire embodying my invention. Fig. 2 is a transverse section of the same on a line $x$—$x$ in Fig. 1. Fig. 3 is a sectional detail view of a portion of the same. Fig. 4 shows a sectional view of a modified construction of my improved tire.

In these drawings A is a wheel-felly, B a metal tire thereon, and C C rubber tire retaining flanges secured to the sides of the wheel-felly A by bolts A' passing therethrough in the usual manner.

The resilient tire D consists substantially of two or more annular sections D', of rubber or other suitable resilient substance, placed side by side in close contact. These sections D' are preferably continuous annular rings, but they can be made of sections of any desired length. These ring sections D' are molded with rivet openings $d$ near the base thereof, and also with rivet openings $d'$ near the tread-face thereof, when two rows of rivets E and E' are used therein, but the rivet holes $d'$ and rivets E' may be dispensed with, and only the rivets E used, if desired.

On the inside faces of the flanges C C there are a series of pairs of lugs $c$ $c$ which when in place, embrace the heads $e$ of the rivets E as illustrated by dotted lines in Fig. 1, which prevents any outward or circumferential movements on the rivets E, yet permits them to move inward freely. For securing the intermediate sections of the tire D in close contact with the metal tire B and to prevent its bulging outward under the stress of usage, I place loose endless metal rings G in the joints $d^2$ between the sections D' in contact with the outsides of the rivets E. In building up this tire I place the rivets in one side section D' of the tire, then place one of the loose endless rings G thereon, and after the desired number of sections D' and loose endless rings G are in place upon the rivets, lateral compression is applied thereto, and heads $e$ placed upon the rivets and riveted down so as to hold the sections D' firmly together. However I preferably secure the sections D' together and at the same time secure the tire to the wheel-rim, by putting one of the flanges C in place, and then placing the rivets, the tire sections D', and metal rings G, thereon, so that when they are laterally compressed the bases of the sections D' will by such compression be brought into gripping contact with the periphery of the metal tire B, and after the riveting of the rivets as described, the other wheel-flange C is put in place and firmly brought up against the side of the tire D so as to further compress the base of it, until the heads of the rivets E enter between the lugs $c$ $c$, as shown in Figs. 2 & 3.

In Fig. 4, I have shown a modified construction in which I use transverse rods $E^2$ in lieu of the rivets E. In this construction I put one of the flanges C in place on the wheel-rim, and then put on the first of the tire sections D' of the tire, after which the transverse rods $E^2$ are inserted into the holes $d$, the loose endless metal rings G and the remaining tire sections are then put in place, after which the other flange C is put in place and secured by bolts A' and the tire sections D' are thereby compressed together until the ends of the rods $E^2$ engage the lugs $c$ $c$ on the inner faces of the flanges C C, the same as is the case with the heads of the rivets E hereinbefore described.

The rivets E', as above stated, may or may not be used, as I do not consider their use essential to the successful construction and use of the tire, but when they are used they are put in the tire at the same time and riveted down upon the heads $e'$ in the same way, as the rivets E hereinbefore described.

I am aware that resilient vehicle tires have heretofore been made of one or more annular rings of rubber, therefore I do not broadly claim a tire constructed of such annular rings, my invention being rather directed to the features of construction of such tires hereinbefore set forth and described.

Therefore having described my invention so as to enable others to construct and use the same, what I claim as new and desire to secure by Letters-Patent is:

1. The combination of a wheel-rim, flanges adapted to be secured to the sides thereof lugs on the inner face of said flanges, a sectional resilient tire composed of resilient sections having their sides in close contact, transverse rods or rivets extending through said sections so as to engage the lugs on the inner faces of the flanges, and loose endless rings between the tire sections embracing said rods or rivets, substantially as set forth.

2. The combination in a vehicle tire of annular resilient sections having their side faces in close contact, a set of transverse rods or rivets extending through said sections, and endless annular metal rings removably inserted between the meeting faces of the resilient tire sections so as to embrace said rods or rivets, substantially as set forth.

3. The combination of a wheel-rim, a fixed metal tire thereon, flanges removably secured to the sides of the wheel rim, a series of pairs of inwardly projecting lugs on the inner faces of said flanges, a tire composed of resilient sections the side faces whereof are in close contact, rivets or rods extending transversely through said resilient tire sections; and between the pairs of lugs on the flanges so as to be engaged thereby, and endless annular rings removably inserted between the meeting faces of the resilient tire sections so as to embrace the rods or rivets extending through the resilient tire sections, substantially as set forth.

4. The combination in a vehicle-tire of annular resilient tire sections having their side faces in close contact, a set of transverse rivets through said sections near the peripheries thereof, a set of transverse rods or rivets through the bases of said resilient sections extending a short distance outwardly beyond the outer faces of said side sections, and loose endless metal rings removably inserted between the meeting faces of said resilient sections so as to embrace the transverse rods or rivets through the bases thereof, substantially as set forth.

In testimony whereof I affix my signature, in presence of two witnesses.

HARRY A. PALMER.

Witnesses:
MARY KINNEY,
E. P. OTIS.